(12) United States Patent
Jogetsu

(10) Patent No.: US 8,872,957 B2
(45) Date of Patent: Oct. 28, 2014

(54) DISPLAY CONTROL METHOD AND DEVICE FOR FINDER DEVICE

(71) Applicant: FUJIFILM Corporation, Tokyo (JP)

(72) Inventor: Tadashi Jogetsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 83 days.

(21) Appl. No.: 13/827,193

(22) Filed: Mar. 14, 2013

(65) Prior Publication Data

US 2013/0194479 A1 Aug. 1, 2013

Related U.S. Application Data

(63) Continuation of application No. PCT/JP2011/061102, filed on May 13, 2011.

(30) Foreign Application Priority Data

Sep. 17, 2010 (JP) ................................. 2010-210226

(51) Int. Cl.
| | |
|---|---|
| H04N 5/222 | (2006.01) |
| G03B 13/10 | (2006.01) |
| G03B 7/099 | (2014.01) |
| G03B 17/20 | (2006.01) |
| G03B 13/02 | (2006.01) |
| G03B 13/04 | (2006.01) |
| H04N 5/232 | (2006.01) |

(52) U.S. Cl.
CPC ............ H04N 5/23293 (2013.01); G03B 13/04 (2013.01); G03B 17/20 (2013.01)
USPC ............ 348/333.09; 348/333.01; 348/333.08; 348/333.12; 396/232; 396/271; 396/296; 396/373

(58) Field of Classification Search
CPC .............. H04N 5/235; H04N 5/23212; H04N 5/23293; G03B 19/12; G03B 13/28; G03B 13/02; G03B 17/20; G09G 2320/0626; G09G 2320/066; G09G 3/3406; G02B 2027/0118
USPC .......... 348/333.01–333.13; 396/84, 141, 148, 396/232, 271, 272, 296, 373–386
See application file for complete search history.

(56) References Cited

U.S. PATENT DOCUMENTS

| | | | |
|---|---|---|---|
| 5,161,025 A | 11/1992 | Nakao | |
| 6,587,644 B2 * | 7/2003 | Takase et al. ................ | 396/149 |

(Continued)

FOREIGN PATENT DOCUMENTS

| | | |
|---|---|---|
| JP | 3-292067 A | 12/1991 |
| JP | 2001-8067 A | 1/2001 |

(Continued)

OTHER PUBLICATIONS

Form PCT/ISA/237 mailed Jun. 14, 2011, for International Application No. PCT/JP2011/061102.

Primary Examiner — Chia-Wei A Chen

(74) Attorney, Agent, or Firm — Birch, Stewart, Kolasch & Birch, LLP

(57) ABSTRACT

There are provided: a half mirror provided in a finder device and transmitting an incident light image from a subject side and projecting the incident light image onto a photographer side finder view window side; a display panel provided in a position facing the half mirror in the finder device and displaying a taken image of the subject taken by an imaging device with given brightness so that the displayed taken image (EVF image) is reflected by the half mirror so as to be projected onto the photographer side finder view window side; and a display control portion changing brightness of the display image (EVF image) displayed on the display panel so that the brightness of the display image (EVF image) increases gradually to given brightness or the brightness of the display image (EVF image) further increases gradually from the given brightness.

25 Claims, 14 Drawing Sheets

(56) References Cited

U.S. PATENT DOCUMENTS

| | | | |
|---|---|---|---|
| 6,661,460 B1* | 12/2003 | Higuchi | 348/333.08 |
| 7,907,201 B2* | 3/2011 | Kojima et al. | 348/333.01 |
| 7,907,202 B2* | 3/2011 | Okazaki | 348/333.01 |
| 8,036,523 B2* | 10/2011 | Kusaka | 396/128 |
| 8,305,297 B2* | 11/2012 | Sugihara et al. | 345/8 |
| 8,610,819 B2* | 12/2013 | Watanabe | 348/362 |
| 2001/0043277 A1 | 11/2001 | Tanaka et al. | |
| 2004/0037546 A1 | 2/2004 | Nonaka | |
| 2005/0046728 A1 | 3/2005 | Schinner | |
| 2005/0156813 A1* | 7/2005 | Adachi et al. | 345/1.3 |
| 2006/0182433 A1* | 8/2006 | Kawahara et al. | 396/123 |
| 2007/0019097 A1* | 1/2007 | Fukui | 348/333.01 |
| 2007/0146527 A1* | 6/2007 | Takizawa | 348/333.01 |
| 2007/0206937 A1* | 9/2007 | Kusaka | 396/89 |
| 2007/0206940 A1* | 9/2007 | Kusaka | 396/128 |
| 2007/0285774 A1* | 12/2007 | Merrirt et al. | 359/465 |
| 2008/0170150 A1* | 7/2008 | Kojima et al. | 348/333.01 |
| 2008/0180549 A1* | 7/2008 | Lee et al. | 348/231.2 |
| 2008/0266439 A1* | 10/2008 | Okazaki | 348/333.01 |
| 2008/0309811 A1* | 12/2008 | Fujinawa et al. | 348/333.01 |
| 2009/0135295 A1* | 5/2009 | Kunishige et al. | 348/362 |
| 2009/0309807 A1* | 12/2009 | Matsumoto | 345/1.1 |
| 2010/0165147 A1 | 7/2010 | Tabata | |
| 2010/0177215 A1* | 7/2010 | Kita | 348/234 |
| 2010/0201894 A1* | 8/2010 | Nakayama et al. | 348/745 |
| 2011/0008031 A1* | 1/2011 | Kusaka | 396/100 |
| 2011/0200318 A1* | 8/2011 | Ichikawa | 396/296 |
| 2012/0249621 A1* | 10/2012 | Miura | 345/694 |
| 2012/0293684 A1* | 11/2012 | Watanabe | 348/229.1 |
| 2012/0300099 A1* | 11/2012 | Watanabe | 348/231.3 |
| 2012/0300109 A1* | 11/2012 | Watanabe | 348/333.02 |
| 2012/0300110 A1* | 11/2012 | Miyazaki | 348/333.02 |

FOREIGN PATENT DOCUMENTS

| | | |
|---|---|---|
| JP | 2001-309211 A | 11/2001 |
| JP | 2002-57920 A | 2/2002 |
| JP | 2002-199256 A | 7/2002 |
| JP | 2003-78785 A | 3/2003 |
| JP | 2004-85935 A | 3/2004 |
| JP | 2009-49603 A | 3/2009 |
| JP | 2010-171962 A | 8/2010 |

* cited by examiner

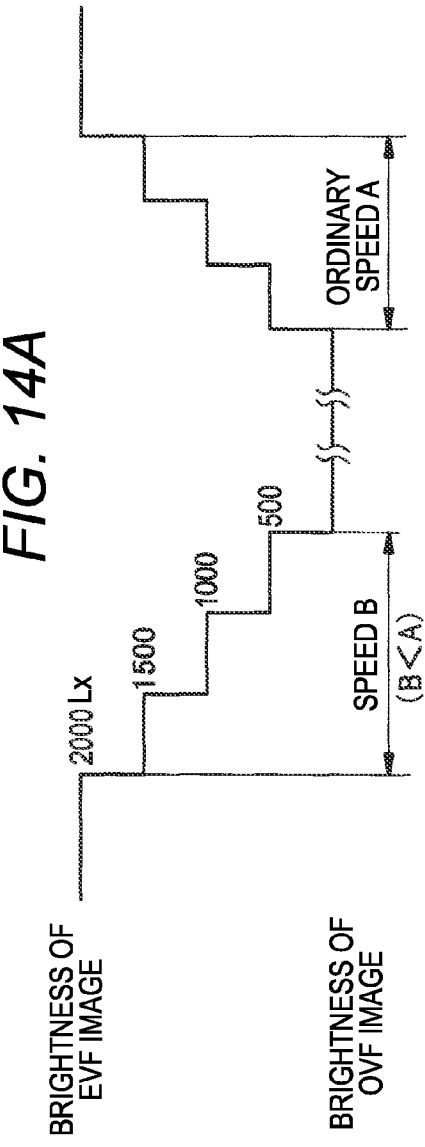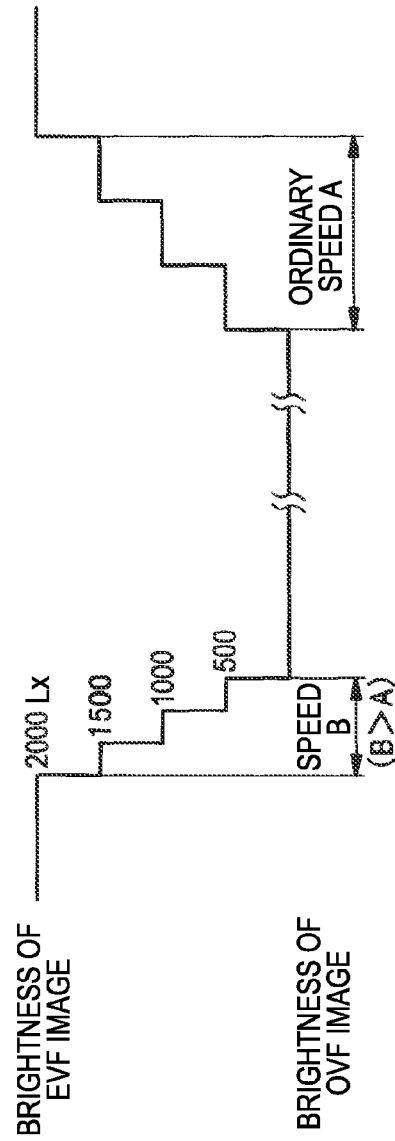

DISPLAY CONTROL METHOD AND DEVICE FOR FINDER DEVICE

CROSS REFERENCE TO RELATED APPLICATIONS

This application is the Continuation of PCT/JP2011/061102 filed on May 13, 2011, which claims priority under 35 U.S.C 119(a) to Patent Application No. 2010-210226 filed in Japan on Sep. 17, 2010, all of which are hereby expressly incorporated by reference into the present application.

TECHNICAL FIELD

The present invention relates to a display control method and device for finder device mounted in an imaging apparatus such as a digital camera. Particularly, it relates to a display control method and device in which easiness in visual recognition of an image confirmed in a finder is improved.

BACKGROUND ART

Solid-state imaging devices are mounted in digital cameras. Therefore, there are lots of such cameras that a through image (live view image) of a subject outputted from a solid-state imaging device is displayed on a liquid crystal display panel or the like provided in the back of the camera or the like so that the liquid crystal display panel or the like is used as a finder device.

When compositional arrangement of a subject or the like is to be confirmed on the liquid crystal display panel provided in the back of the camera, it is difficult to watch the liquid crystal display panel itself if ambient light in the surroundings is too bright. It is therefore preferable that whether ambient light is bright or not, is detected by a sensor, and that the backlight of the liquid crystal display panel is controlled in accordance with the brightness of the ambient light in the surroundings, for example, as described in Patent Literature 1.

When the liquid crystal display panel in the back of the camera is used as a substitute for a finder, it is impossible to confirm an image of a subject unless the camera is kept away from a face (eye) to watch the subject. Accordingly, the compositional arrangement of the subject is confirmed in a state where the camera is kept away from the face. A shutter button has to be pushed down in this state. However, when a photographer takes up such a posture to take a photograph, a camera shake occurs. Therefore, an optical view finder device is mounted in Patent Literature 1.

There are lots of digital cameras equipped with electronic view finder devices instead of the optical view finder devices. Such an electronic view finder device has a small-size display panel installed in a finder so that a through image outputted from a solid-state imaging device is displayed on the display panel. For this reason, the subject image can be confirmed without being influenced by ambient light in the surroundings and the shutter button can be pushed down while the subject image is confirmed in the finder (that is, the finder of the camera is pressed against the face). Accordingly, there is an advantage that the camera shake hardly occurs.

In the electronic view finder device according to the background art, a photographer side view window of the finder is blocked by a user's eye to reduce the amount of ambient light entering the inside when an image in the finder is confirmed by the user. For this reason, an image always with predetermined brightness (e.g. 2000 Lx) is displayed in the electronic view finder device according to the background art. However, when the photographer views the image with such brightness in the finder, the photographer may be dazzled to make it difficult to visually recognize the image because the pupil of the photographer's eye cannot change quickly enough in accordance with the brightness of ambient light in the surroundings before viewing.

In the electronic view finder device according to the background art, the display panel mounted in the inside is so small in size that only rough images can be displayed. There is another problem that detailed portions of the compositional arrangement of the subject cannot be confirmed. Moreover, because the through image is displayed, it takes time for image processing. There is a further problem that a little time lag occurs compared with the actual state of the subject.

In addition, among camera fans, there are a lot of voices for demanding mounting of the optical view finder. Therefore, a digital camera equipped with a hybrid finder device, for example, as described in the following Patent Literatures 2 and 3 has been considered.

When a hybrid finder device is mounted in a digital camera, one of an optical view finder (hereinafter also referred to as OVF) and an electronic view finder (hereinafter also referred to as EVF) is switched over to the other so that a subject image is displayed in the common finder or imaging condition information, etc. displayed in the electronic view finder is displayed so as to be superposed on the optical image of the subject via the optical view finder.

In this case, the optical image of the subject via the optical view finder changes in accordance with the brightness of ambient light in the surroundings. Accordingly, when the optical image of the subject is switched to an image in the electronic view finder or inversely the image in the electronic view finder is switched to that in the optical view finder or when the two are displayed so as to be superposed on each other, there is a possibility that the pupil of the photographer's eye cannot change quickly enough so that the photographer may be dazzled to make it difficult to visually recognize the image.

CITATION LIST

Patent Literature

Patent Literature 1: JP-A-2002-199256
Patent Literature 2: JP-A-2004-85935
Patent Literature 3: JP-A-3-292067

SUMMARY OF INVENTION

Technical Problem

An object of the invention is to provide a display control method and device for finder device in which change of the pupil of an eye viewing a finder is considered so that the dazzle of the eye is prevented to make visual recognition of an image easy.

Solution to Problem

A display control device for finder device of the present invention is characterized by comprising: a half mirror which is provided in a finder device and which transmits an incident light image from a subject side and projects the incident light image onto a photographer side finder view window side; a display panel which is provided in a position facing the half mirror in the finder device and which displays a taken image of the subject taken by an imaging device with given brightness so that the displayed taken image is reflected by the half mirror so as to be projected onto the photographer side finder view window side; and a display control portion which changes brightness of the display image displayed on the display panel so that the brightness of the display image increases gradually to given brightness or the brightness of the display image further increases gradually from the given brightness.

A display control method for a finder device of the present invention is characterized in that, the finder device includes a half mirror which is provided in a finder device and which transmits an incident light image from a subject side and projects the incident light image onto a photographer side finder view window side, and a display panel which is provided in a position facing the half mirror in the finder device and which displays a taken image of the subject taken by an imaging device with given brightness so that the displayed taken image is reflected by the half mirror so as to be projected onto the photographer side finder view window side; in which brightness of the display image displayed on the display panel is changed so that the brightness of the display image increases gradually to the given brightness or the brightness of the display image further increases gradually from the given brightness.

Advantageous Effects of Invention

According to the invention, a bright image is prevented from being suddenly displayed on a display panel, so that a photographer viewing the image on the display panel can be prevented from being dazzled.

BRIEF DESCRIPTION OF DRAWINGS

FIGS. 14A and 14B are graphs showing examples of EVF image control in the case where an EVF image is changed over to a dark OVF image.

DESCRIPTION OF EMBODIMENTS

An embodiment of the invention will be described below with reference to the drawings.

Figure 1:
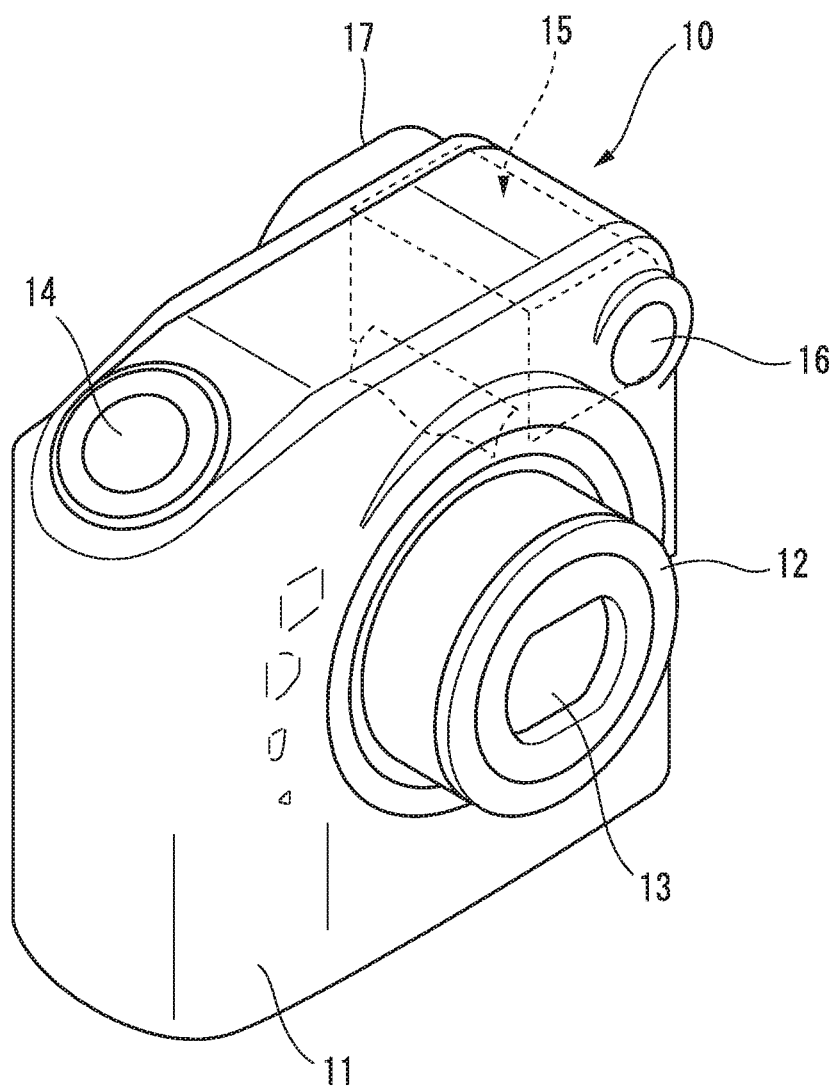
FIG. 1 is a perspective view showing the external appearance of a digital camera according to an embodiment of the invention.

FIG. 1 is a perspective view showing the external appearance of a compact type digital camera according to an embodiment of the invention. A digital still camera 10 which is an imaging apparatus according to this embodiment has a rectangular housing 11, a retractable lens barrel 12 provided in the frontal center of the housing 11, and an imaging lens (such as a focus lens, a zoom lens, etc.) 13 received in the lens barrel 12.

A shutter release button 14 is provided on one side of an upper end surface of the housing 11. A hybrid type finder device 15 which will be described later in detail is provided in the housing 11 at a corner on a side opposite to the shutter release button 14. The finder device 15 has a subject side finder window 16 provided in a front corner portion of the housing 11, and a photographer side finder view window 17 provided in the back side of the housing 11.

Figure 2:
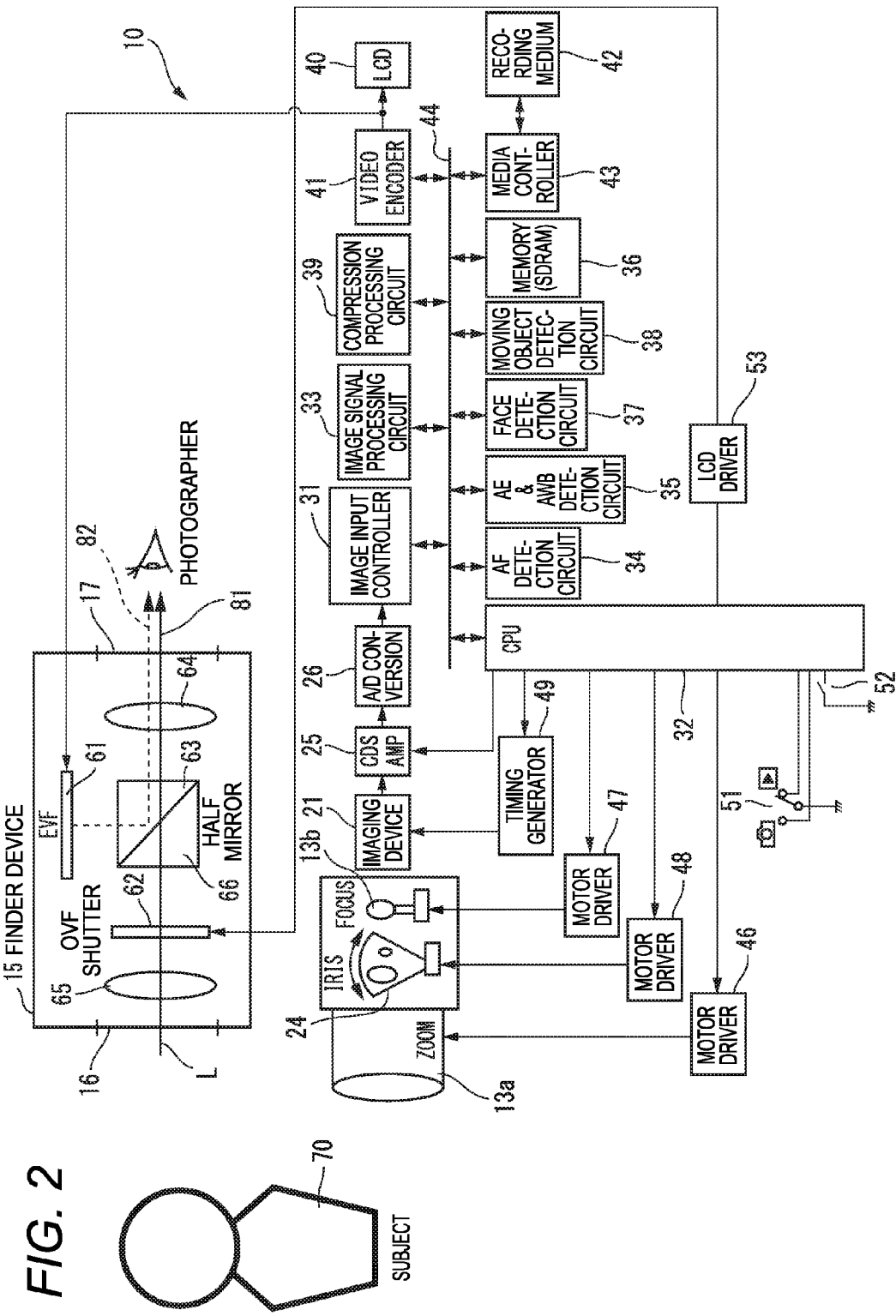
FIG. 2 is a view showing the internal configuration of the digital camera shown in FIG. 1.

FIG. 2 is a block diagram showing the internal configuration of the digital camera 10 shown in FIG. 1. The digital camera 10 has a single panel type color image-taking solid-state imaging device 21, an imaging lens 13 (including a zoom lens 13a and a focus lens 13b) disposed in front of the solid-state imaging device 21, a lens stop (iris) 24, a CDSAMP (correlated double sampling (CDS) and gain control amplifier (AMP)) 25 for analog signal processing of an output signal (taken image signal) of the solid-state imaging device 21, and an analog-to-digital (A/D) converter 26 for converting an output signal of the CDSAMP 25 into a digital signal. Although this example shows the case where the solid-state imaging device 21 is of a CCD type, it is a matter of course that another type solid-state imaging device such as a CMOS type solid-state imaging device may be used.

The digital camera 10 further has an image input controller 31 which fetches a taken image signal made of a digital signal outputted from the A/D converter 26, an arithmetic processor (CPU) 32 which generally controls the whole of the digital camera 10, an image signal processing circuit 33 which applies image processing to the taken image signal, an AF detection circuit 34 which detects a focal position based on image data outputted from the solid-state imaging device 21, an AE & AWB detection circuit 35 which detects exposure and white balance automatically, an SDRAM 36 which serves as a storage portion used as a work memory, a face detection circuit 37 which detects a "face" image in a subject, a moving object detection circuit 38 which detects a moving object in the subject, a compression processing circuit 39 which compresses the image-processed taken image data into a JPEG image or an MPEG image, a video encoder 41 which displays the taken image, a through image and various kinds of information (which will be described later) on a liquid crystal display device 40 provided in the back or the like of the camera and on a liquid crystal display device (EVF panel) 61 in the finder device 15, a media controller 43 which stores the taken image data in a recording medium 42, and a bus 44 which connects these to one another.

The digital camera 10 further has a motor driver 46 which supplies driving pulses to a drive motor of the zoom lens 13a, a motor driver 47 which supplies driving pulses to a motor for driving the position of the focus lens 13b, a motor driver 48 which supplies driving pulses to a drive motor for controlling the iris position of the iris 24, and a timing generator 49 which supplies driving timing pulses (electronic shutter pulses, readout pulses, transfer pulses, etc.) to the solid-state imaging device 11. These operate based on instructions given from the CPU 32. The CDSAMP 25 also operates based on instructions given from the CPU 32.

The CPU 32 further has a switch 51 for changing over from one of an imaging mode and a playback mode to the other, and a double action type shutter release button 52 (which is the same as designated by the reference numeral 14 in FIG. 1). The CPU 32 controls the digital camera 10 based on user instructions inputted from these switches 51 and 52. The digital camera 10 according to this embodiment further has a liquid crystal driver 53 which operates based on an instruction given from the CPU 32. The liquid crystal driver 53 drives the opening/closing of a liquid crystal shutter (OVF shutter) 62 (which will be described later) in the finder device 15.

An objective lens 65, an OVF shutter 62, a prism 66 having a half mirror 63 in its inside and an ocular lens 64 are received in this order in the finder device 15 between the subject side finder window 16 and the photographer side view window 17. The objective lens 65 may be a fixed focal length lens or may be a zoom lens which can be interlocked with zooming of the imaging lens 13.

The half mirror 63 is disposed so as to be inclined at 45 degrees with respect to an axis L of incident light from the subject. The aforementioned liquid crystal display device 61 used for EVF is disposed so as to be adjacent to the half mirror 63 and parallel to the incident light axis L. In this manner, while light emitted from the liquid crystal display device 61 and reflected by the half mirror 63 is superposed on the incident light given from the subject and transmitted through the half mirror 63, the superposed light is projected onto a photographer's eye. Although the half mirror 63 is preferably made of a material such as a silver film which transmits 50% of light but reflects 50% of light, the ratio of transmitted light to reflected light is not limited to this ratio. Another ratio may be used as long as both transmitted light and reflected light exist. For example, a film which transmits 70% (or 60%) of light but reflects 30% (or 40%) of light or conversely a film which transmits 30% (or 40%) of light but reflects 70% (or 60%) of light may be used.

A not-shown changeover switch capable of being operated by the photographer is provided in the liquid crystal display device 61 so that the same information as in the liquid crystal display device 40 provided in the back of the camera can be displayed exclusively on the liquid crystal display device 61. Although the information displayed on the liquid crystal display device 61 is through image information and taken image information outputted from the solid-state imaging device 21, information such as imaging conditions may be displayed.

When the OVF shutter 62 is "opened" and the EVF color display device 61 is set as non-display, the finder device 15 is used as an optical view finder (OVF) so that light 81 from the subject 70 is projected onto the photographer's eye. When the OVF shutter 62 is "closed" and the EVF color display device 61 is set as display, the finder device 15 is used as an electronic view finder (EVF) so that light 82 from the display device 61 is projected onto the photographer's eye.

When the OVF shutter 62 is "opened" while information such as imaging information is displayed on the EVF color display device 61, the imaging condition information can be confirmed in the same finder frame simultaneously while an optical image showing the compositional arrangement of the subject is confirmed in the optical view finder.

Figure 3A:
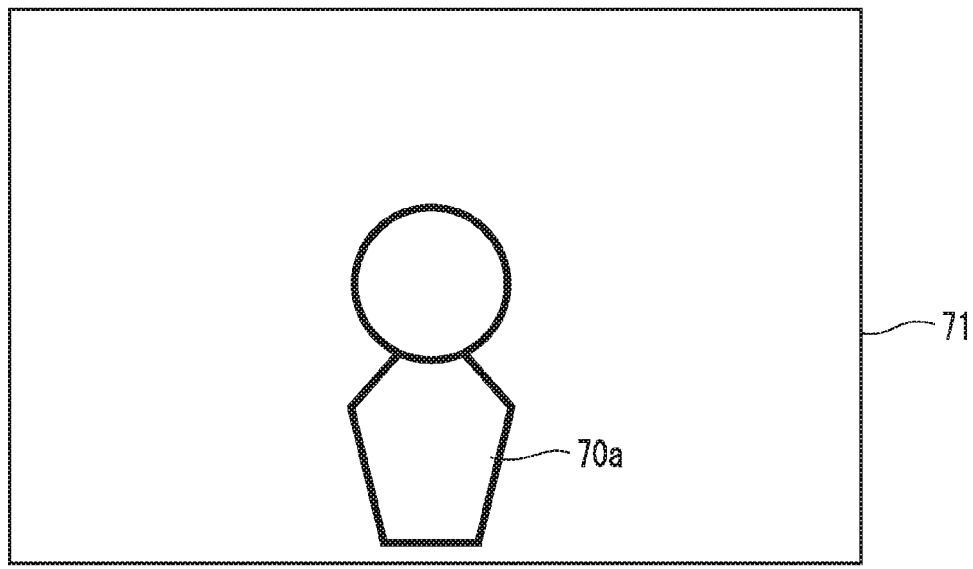
FIG. 3A is a view showing an example of an optical image via an optical view finder and FIG. 3B is a view showing an example of information based on EVF displayed so as to be superposed on the optical image.

FIG. 3A shows an example of the optical image incident on the subject side finder window 16 of the finder device 15, transmitted through the half mirror 63, transmitted through the photographer side view window 17 and projected onto the photographer's eye. An optical image 70a of the subject 70 shown in FIG. 2 is formed in the center of the finder frame 71.

Figure 3B:
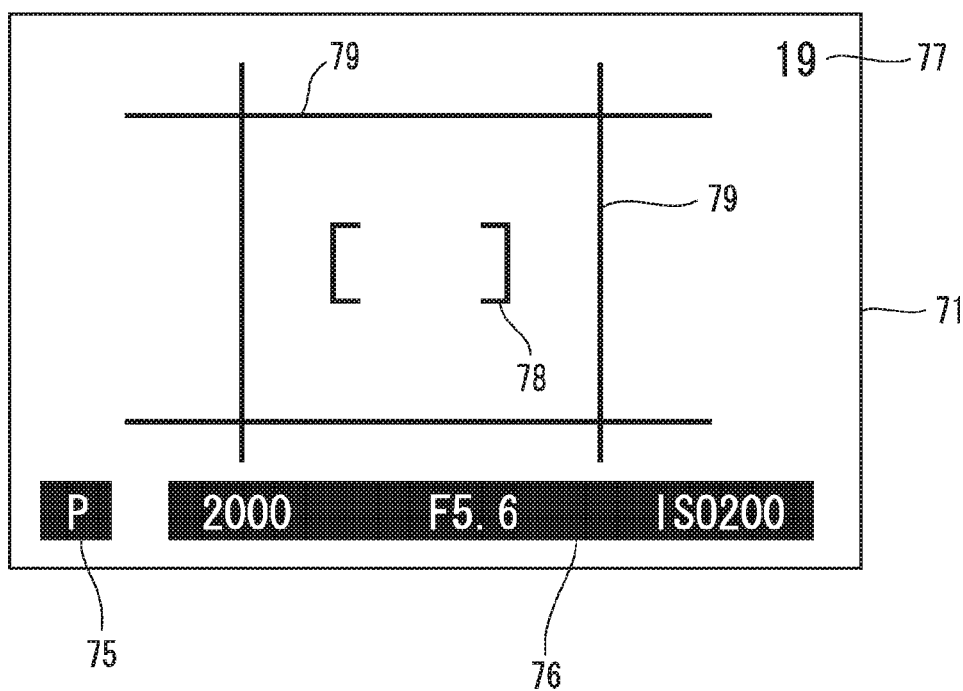

FIG. 3B is a view showing an example of information such as imaging conditions displayed on the EVF color display device 61. "P" (program imaging mode in this example) indicating imaging mode information 75 and imaging condition information (shutter speed 1/2000 sec., iris F=5.6, ISO speed 200) 76 are displayed on the lower side of the screen (finder frame 71) while taken image number information 77 exemplifying "19 pieces" is displayed on the upper right corner of the screen. An AF frame 78 indicating a focused position and framing guide lines 79 are displayed in the center portion of the screen.

Figure 4:
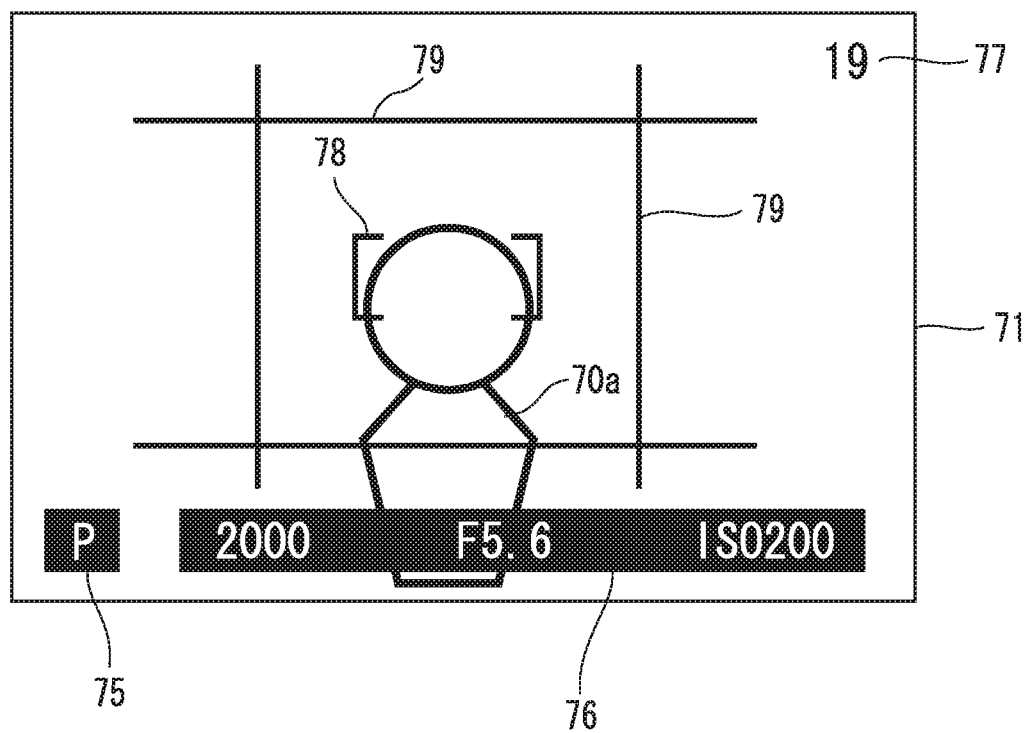
FIG. 4 is a view showing an example of display of FIG. 3B superposed on FIG. 3A.

FIG. 4 shows a state where the respective pieces of information shown in FIGS. 3A and 3B are superposed on each other while the OVF shutter 62 is "opened". In this manner, display information based on the EVF can be displayed so as to be superposed on the subject image based on the optical view finder.

A point to notice here is that the respective pieces of information 75 to 79 shown in FIG. 3B must not be displayed in "black". Because "black" cannot be expressed in light, "black" is actually expressed in such a manner that light is shielded. In the case of a liquid crystal display device, "black" is expressed in such a manner that a pixel position to be expressed in black is shielded to prevent light of the backlight from leaking out to the front surface. In the case of a self-emission display device such as an organic light-emitting device, "black" is expressed in such a manner that light emission is stopped at a pixel position for expressing "black".

For this reason, when this "black" information is superposed on information indicating "presence" of light of the optical view finder, the "black" information is overwritten by "white" indicating "presence" of light so that the information expressed in black disappears. It is therefore necessary to display the respective pieces of information 75 to 79 shown in FIG. 3B in some chromatic color while stopping display of "black". Incidentally, it is a matter of course that "black" may be displayed when only the image of the EVF display device 61 is displayed in the finder.

As shown in FIG. 4, when the display image of the EVF display device 61 is displayed so as to be superposed on the optical image of the subject via the optical view finder, it may be hard to see the image if there is a large difference in brightness level between the two.

Therefore, the brightness of the subject via the optical view finder is detected based on the taken image signal outputted from the solid-state imaging device 21, so that the image of the display device 61 is displayed with the same brightness as the brightness. In this manner, the combined image becomes easy to see. Configuration may be made so that the brightness of the subject due to the ambient light in the surroundings is not detected based on the output signal of the solid-state imaging device 21 but detected by a separately placed illuminance sensor.

For example, when the brightness of the ambient light in the surroundings is 10 Lx, the combined image becomes easy to see if the brightness of the image displayed on the EVF display device 61 is also controlled to be 10 Lx. Assume now that the photographer changes the operation switch in this state to use the finder device 15 as an electronic view finder so that the through image outputted from the solid-state imaging device 21 is displayed on the finder device 15.

When the finder device 15 is operated as an electronic view finder, an image with given brightness, for example, an image with 2000 Lx is heretofore displayed in the finder so that the EVF image always easy to see in any circumstances can be provided to the photographer.

Figure 5:
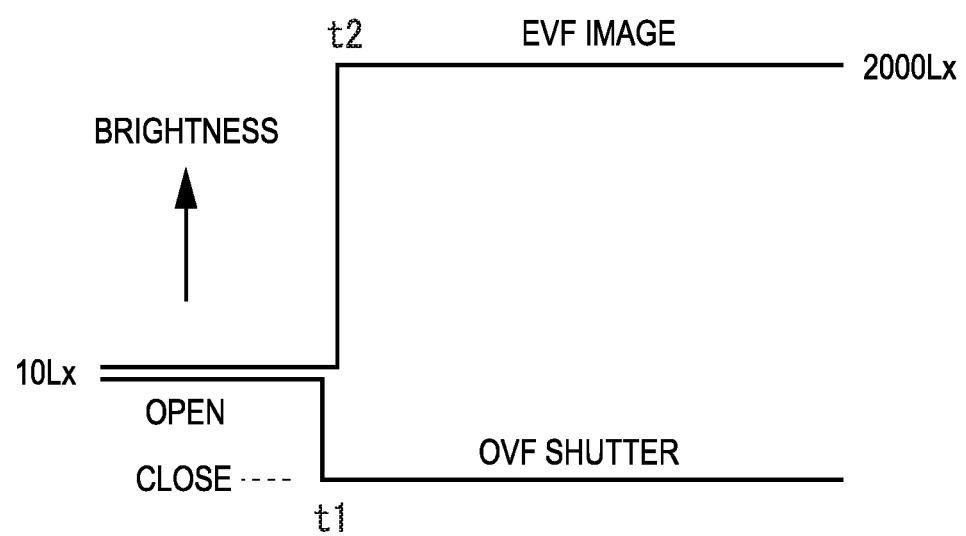
FIG. 5 is a view for explaining a disadvantage in the case where an OVF optical image is changed over to an EVF image suddenly.

When the EVF image is to be displayed, for example, as shown in FIG. 5, the OVF shutter 62 is "closed" so that the EVF image is displayed while the OVF optical image is blocked. When the OVF shutter 62 is "opened", the photographer's eye accustoms itself to 10 Lx so that the pupil of the eye is dilated suitably for 10 Lx. When the OVF shutter 62 is "closed" from this state so that the EVF image with 2000 Lx is displayed, a pure white EVF image is seen instantaneously in the photographer's eye but an EVF image with normal brightness can be visually recognized as the pupil of the eye is contracted. When the eye is dazzled even instantaneously in this manner, it is difficult to visually recognize the EVF image instantaneously.

Figure 6:
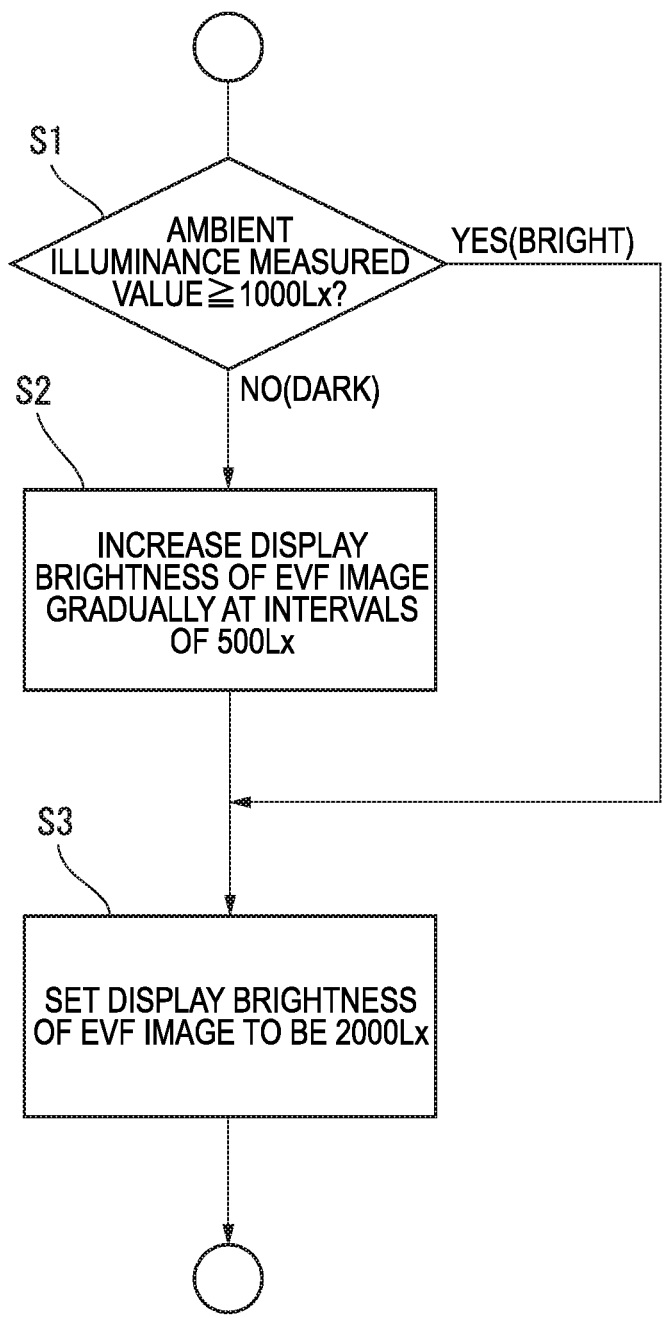
FIG. 6 is a flow chart showing a processing procedure of display control according to a first embodiment of the invention.

Therefore, in this embodiment, as shown in FIG. 6, when switching of OVF to EVF occurs in the finder device 15, determination is first made as to whether the measured value of ambient illuminance in the surroundings is at least given illuminance such as 1000 Lx or not (step S1). When there is such a bright environment that the measured value of ambient illuminance is larger than the given illuminance value, the flow of processing goes to step S3 because the pupil of the eye is contracted. In the step 3, the display brightness of the EVF image is set to be a default value 2000 Lx. Then, the processing is terminated.

When the determination in the step S1 results in that the measured value of ambient illuminance in the surroundings is smaller than 1000 Lx to indicate a dark state, the flow of processing goes from step S1 to step S2. In the step S2, the display brightness of the EVF image is increased gradually stepwise at intervals of given brightness such as 500 Lx. Then, the flow of processing goes to step S3, so that brightness of 2000 Lx is obtained finally.

In this manner, the photographer can be prevented from being dazzled, so that the photographer can visually recognize the EVF image easily.

Incidentally, adjustment of the brightness of the EVF image can be controlled by use of a brightness adjustment function of the backlight (in the case of a liquid crystal display device). Or brightness control may be made by use of an image luminance adjustment function (γ curve).

Figure 7:
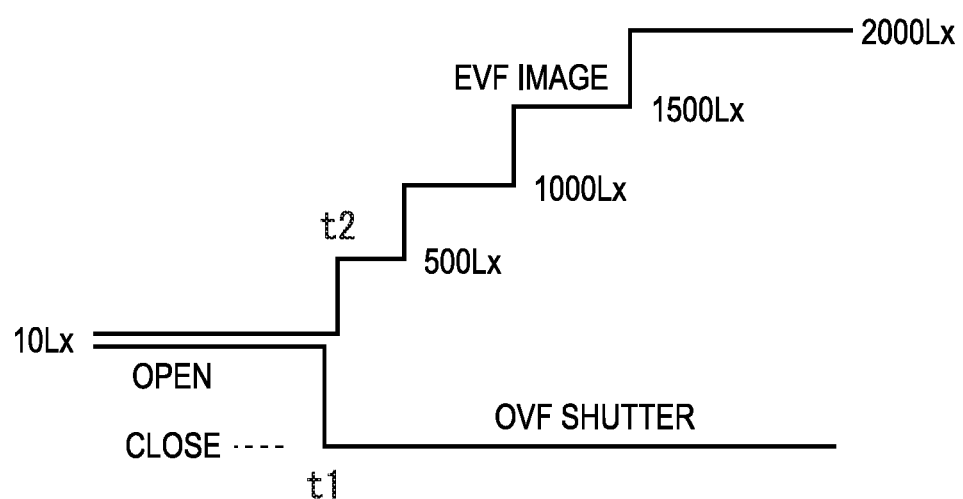
FIG. 7 is a view for explaining control of the brightness of the EVF image based on the processing procedure of FIG. 6.

FIG. 7 is a graph showing change of the brightness of the EVF image displayed in accordance with the processing procedure of FIG. 6. In the illustrated example, because the measured value of ambient illuminance is 10 Lx, the EVF image is stepwise brightened to 2000 Lx at intervals of 500 Lx.

In the flow chart of FIG. 6, ambient illuminance is measured so that the value of ambient illuminance is set as brightness at which brightness control of the EVF image is started. When the difference between timing t1 of "closing" the OVF shutter and timing t2 of displaying the EVF image as shown in FIG. 7 is small, the eye accustoms itself to the brightness of ambient illuminance. However, when the difference becomes large, the eye accustoms itself to the brightness of the inside of the finder device 15 made completely black due to "closing" of the OVF shutter so that the pupil of the eye is dilated.

In this case, because the step S1 of determination based on the measured value of ambient illuminance is not required, processing always starts at the step S2 so that brightness change control of the EVF image starts at a value of 0 Lx.

With respect to the time and slope or the number of steps and timing for increasing the brightness of the EVF image shown in FIG. 7, it is preferable that control is performed in accordance with the type (night scene, portrait night scene, candlelight image, etc.) of the EVF image to be displayed.

FIGS. 8A to 8D show four patterns, i.e. a pattern (FIG. 8A) of stepping up to 2000 Lx at intervals of 500 Lx in a long time, a pattern (FIG. 8B) of stepping up to 2000 Lx at intervals of 1000 Lx in the long time, a pattern (FIG. 8C) of stepping up to 2000 Lx at intervals of 500 Lx in a short time which is a half of the aforementioned long time, and a pattern (FIG. 8D) of stepping up to 2000 Lx at intervals of 1000 Lx in the short time likewise.

Incidentally, FIGS. 8A to 8D are simply shown by way of example and brief description is made so that detailed description is omitted. For example, when ambient illuminance is 700 Lx, it is a matter of course that 2000 Lx cannot be obtained by stepping-up at intervals of 500 Lx. In this case, the ambient illuminance is first stepped up by 300 Lx and then stepped up at intervals of 500 Lx. Or the ambient illuminance is stepped up at intervals of 500 Lx and finally stepped up by 300 Lx.

The four patterns shown in FIGS. 8A to 8D are stored in advance as table data, for example, in a not-shown ROM provided in the CPU 32 in FIG. 2. The CPU 32 analyzes output information of the solid-state imaging device 21 obtained from the image signal processing circuit 33, etc. working under the CPU 32, determines the type of the subject such as whether it is a night scene or not, whether it is a portrait or not, whether it is a candlelight image or not, etc., selects a proper pattern corresponding to the type of the subject, and controls the EVF display device 61.

Figure 8A:
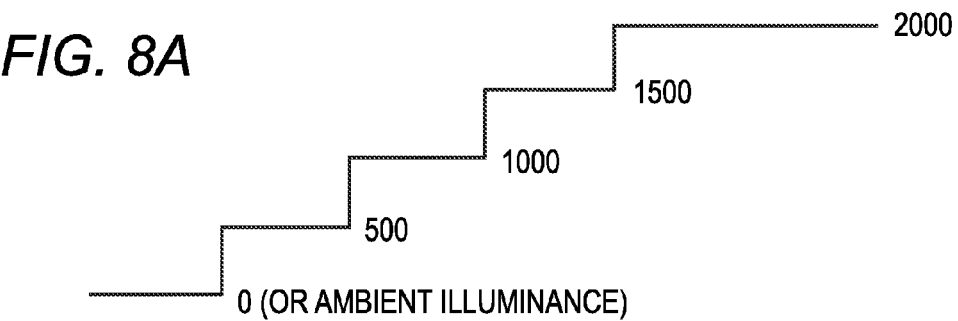
FIGS. 8A to 8D are graphs showing four examples of brightness control patterns of the EVF image.
Figure 8B:
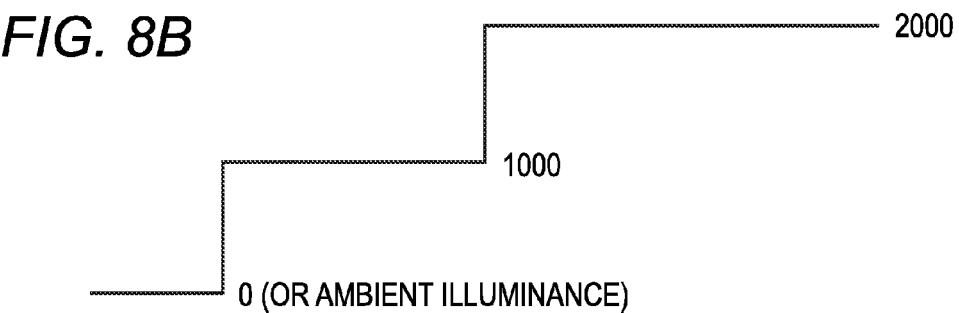
Figure 8C:
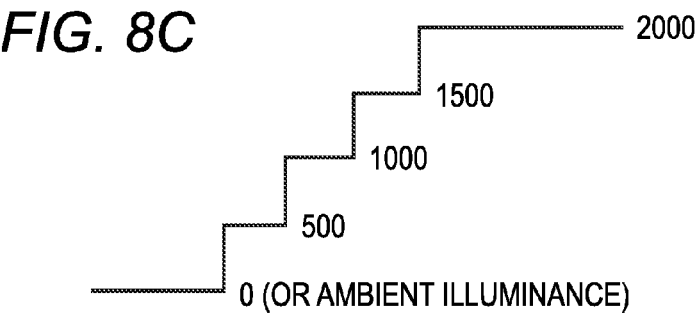
Figure 8D:
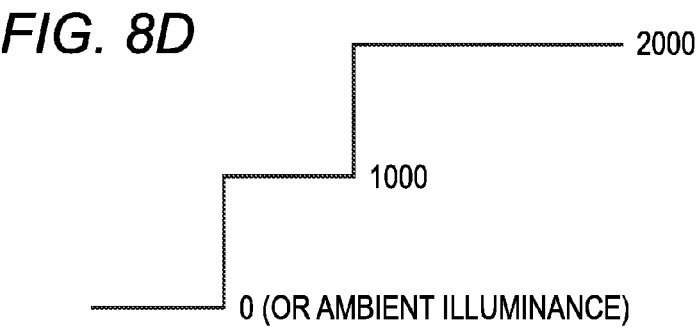

Preferably, in the case of a night scene of a city brightened by neon signs or the like, the pattern of FIG. 8D is selected because the eye accustoms itself immediately even if the EVF image is brightened in a short time. In the case of a night scene which is not so bright as that of the city but has a lot of light spots, the pattern of FIG. 8C is selected. In the case of a candlelight image having only one light spot, the pattern of FIG. 8A is selected because the image is dark. However, when the candlelight image is near, either the pattern of FIG. 8C or the pattern of FIG. 8D is selected without any problem because the range of the light spot in the center is so wide that the pupil of the eye viewing the light spot is contracted. In the case where there are a lot of light spots each of which is small as in the starry sky, either the pattern of FIG. 8B or the pattern of FIG. 8D is selected because there is no problem even if the brightness is increased suddenly.

Although control based on the patterns in FIGS. 8A to 8D has been described in units of "lux", actual control may be performed by use of "candela" or by use of exposure value (Ev) often used in a camera. The same rule applies to the following embodiments.

Figure 9:
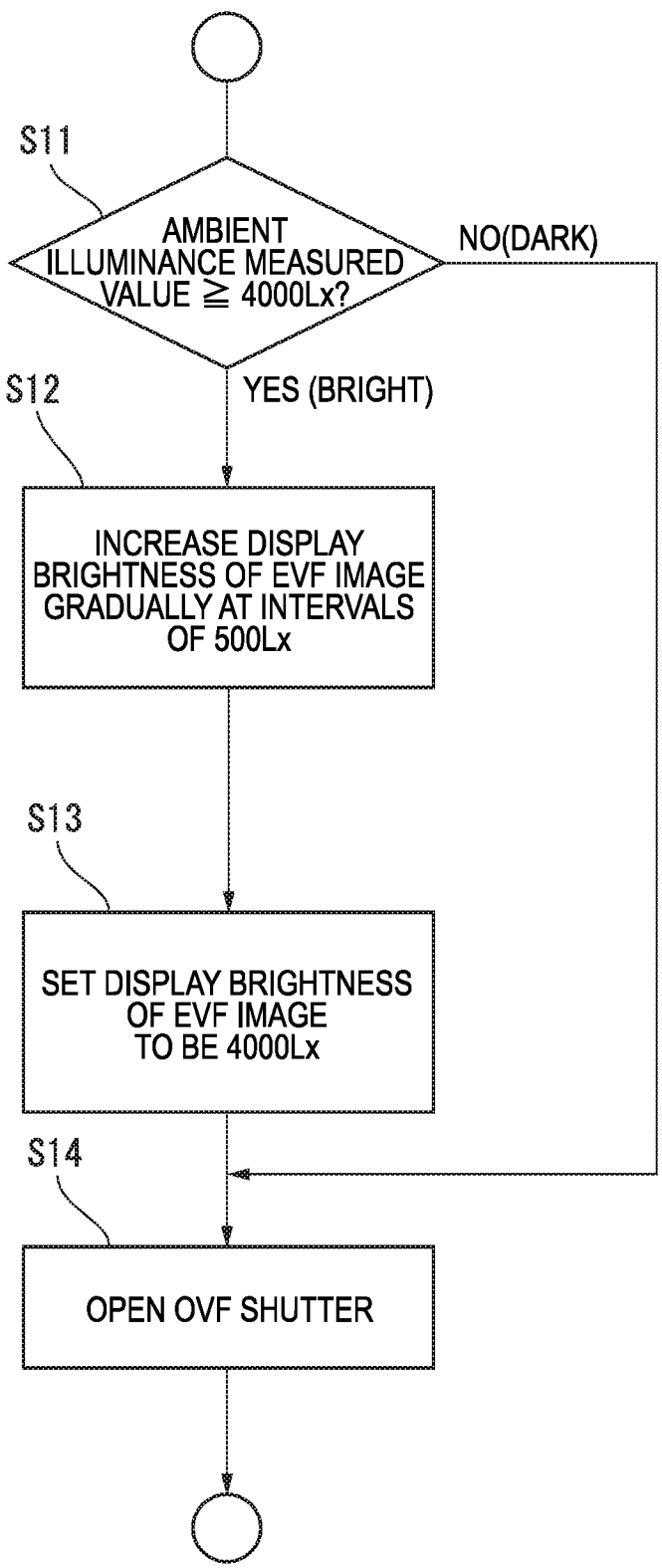
FIG. 9 is a flow chart showing a processing procedure of display control according to a second embodiment of the invention.

FIG. 9 is a flow chart for explaining a second embodiment of the invention. In this embodiment, inversely with the first embodiment described with reference to FIG. 6, when an EVF image is displayed on an electronic view finder, the view finder is switched to an optical view finder. Or an optical image of a subject via the optical view finder is displayed so as to be superposed on the EVF image.

When an EVF image is switched to an OVF light image or an OVF light image is displayed so as to be superposed on the EVF image in a state where only the EVF image with brightness of 200 Lx is displayed in the finder device 15, a large amount of OVF light comes into the eye in a moment that the EVF image is switched to the OVF light image or the OVF light image is superposed on the EVF image so that the eye is dazzled instantaneously, on the assumption that the OVF light image has high luminance, for example, of 6000 Lx. It is therefore necessary to contract the pupil of the eye before switching to the OVF light image.

Therefore, determination is first made as to whether measured ambient illuminance is at least 4000 Lx or not, that is, whether the OVF light image is at least 4000 Lx or not (step S11). When the brightness is at least 4000 Lx, the flow of processing goes to step S12 in which the brightness of the EVF image is stepped up in order of 2000 Lx, 2500 Lx, 3000 Lx and 3500 Lx at intervals of 500 Lx. Then, the flow of processing goes to step S13 in which the display brightness of the EVF image is set to be 4000 Lx.

In the next step S14, the OVF shutter 62 is "opened" so that the OVF light image is introduced into the finder device 15. Then, this processing is terminated. Because the EVF image is brightened to 4000 Lx, the pupil of the eye becomes so sufficiently small that the eye can sufficiently accustom itself to the brightness change when the OVF light image with 6000 Lx comes into the finder device 15.

When the determination in the step S11 results in that the ambient illuminance is lower than 4000 Lx, the flow of processing skips over the steps S12 and S13 but goes to the step S14 in which the OVF shutter 62 is "opened". Then, this processing is terminated.

Figure 10A:
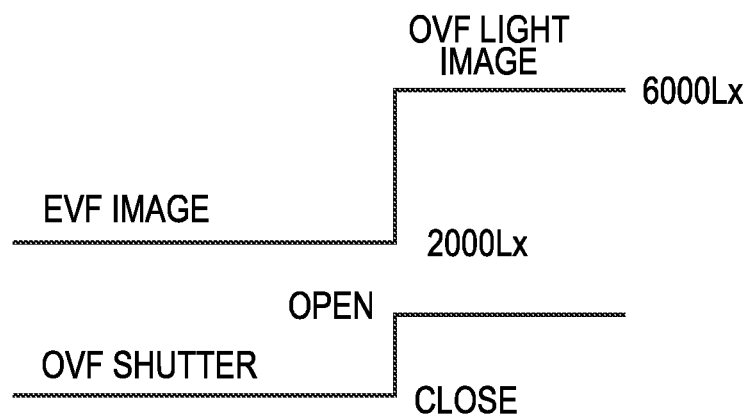
FIGS. 10A and 10B are views for explaining control of the brightness of the EVF image based on the processing procedure of FIG. 9.

FIG. 10A is a graph showing change of brightness when a bright OVF light image is projected into the finder device 15 in a state where the OVF shutter is "opened" without processing in the embodiment shown in FIG. 9. In this case, because the OVF light image with 6000 Lx having a difference of 4000 Lx from the EVF image with 2000 Lx comes into the eye suddenly, the eye is dazzled in a moment.

Figure 10B:
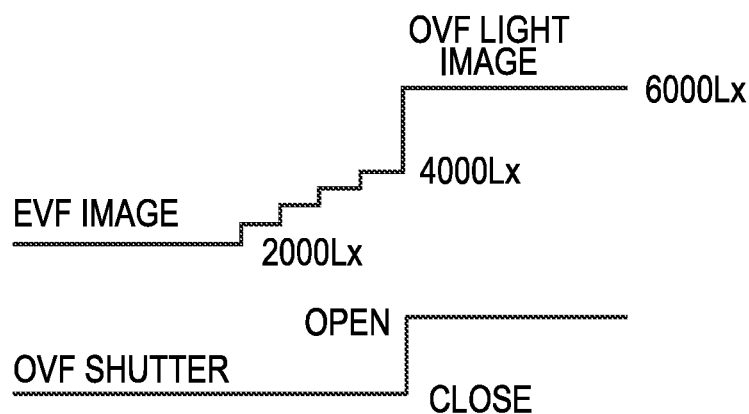

FIG. 10B is a graph showing change of brightness in the finder device 15 when processing in the embodiment shown in FIG. 9 is performed. According to this embodiment, the brightness of the EVF image is increased from 2000 Lx to 4000 Lx before the timing of "opening" the OVF shutter. Accordingly, the difference between the brightness of the EVF image and the brightness of the OVF light image is reduced to 2000 Lx. Even when the OVF shutter is "opened", the eye is prevented from being dazzled because the eye accustoms itself to the bright light so that the pupil of the eye is contracted.

Although the embodiment shown in FIGS. 9 and 10B shows the case where the brightness of the EVF image is increased to 4000 Lx as an upper limit, the brightness of the EVF image may be further increased gradually to the brightness (6000 Lx in this example) of the OVF light image. However, because the eye accustoms itself to the bright image when the brightness reaches some threshold (4000 Lx in the aforementioned example) or higher, the aforementioned upper limit (4000 Lx) may be provided in the brightness to attain reduction of control load. In this embodiment, the timing of "opening" the OVF shutter is determined based on comparison between the brightness of the OVF light image and the brightness of the EVF image.

Figure 11:
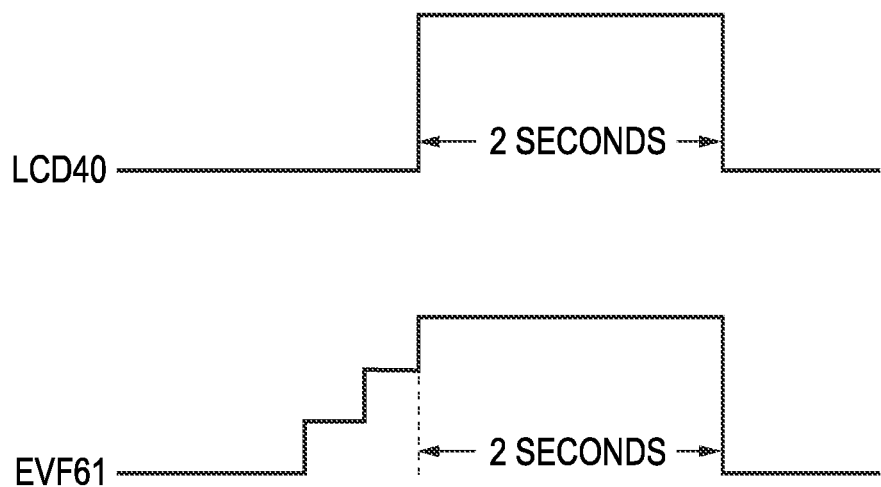
FIG. 11 is a view for explaining control of the brightness of the EVF image according to a third embodiment of the invention.

FIG. 11 is a view for explaining a third embodiment of the invention. In a digital camera, when an image is taken and then image processing thereof is completed, the taken image is displayed on the LCD 40 or the EVF display device 61 in FIG. 2. This is called preview display. For example, the taken image is displayed for about 2 seconds as shown in FIG. 11. The time is not limited to 2 seconds. For example, the taken image may be displayed till next pushing-down of the shutter button.

When this preview display is performed by the finder device 15, there is a possibility that a photographer viewing the finder will be dazzled when the photographer views the preview display with 2000 Lx suddenly. Therefore, as shown in a lower half of FIG. 11, when preview display is performed on the EVF display device 61, brightness is increased stepwise gradually so that preview display with 2000 Lx is performed for 2 seconds finally. In this manner, preview display easy to see can be performed.

Incidentally, in this case, because preview display with proper brightness (e.g. 2000 Lx) is delayed as the number of steps for stepping up the brightness increases, it is preferable that the number of steps is reduced. Although the illustrated example shows the case where the brightness is stepped up to 2000 Lx in three steps, the number of steps may be two.

Figure 12:
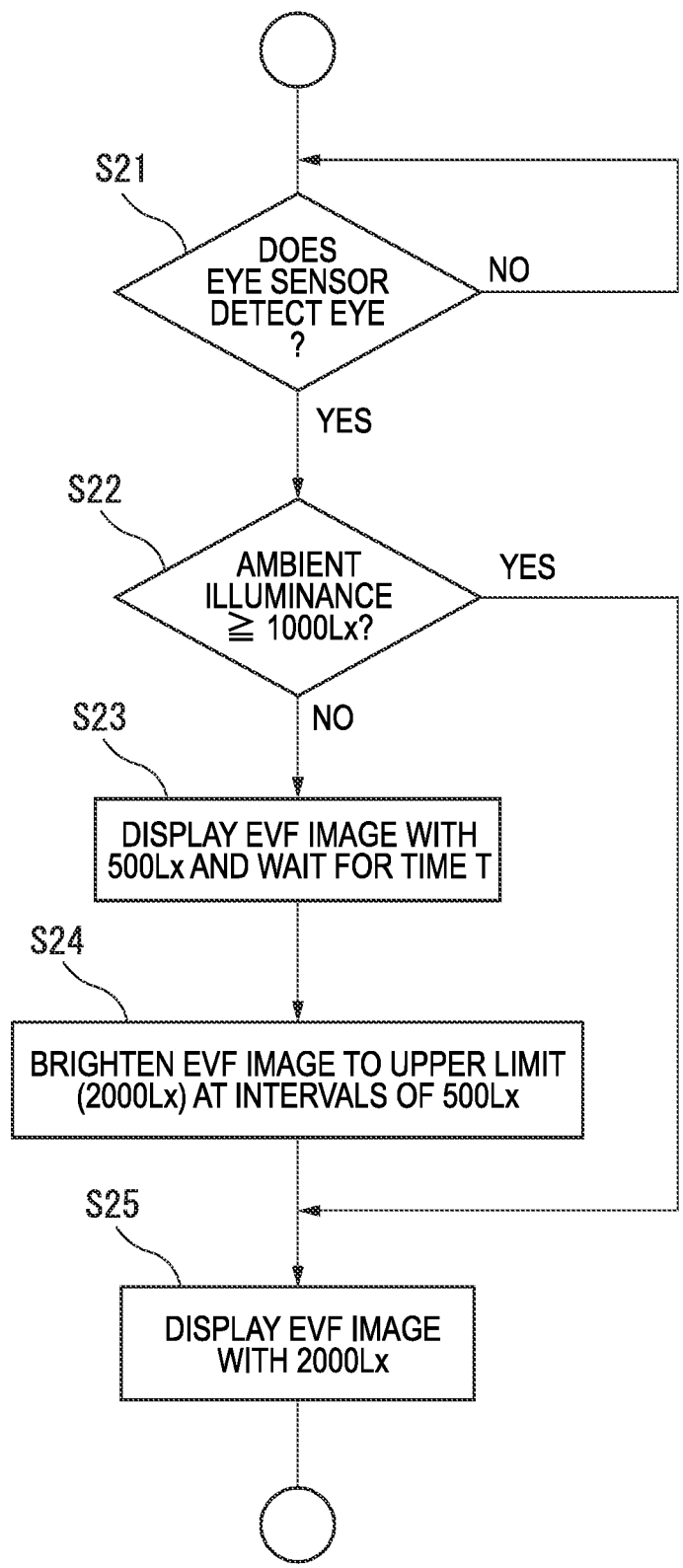
FIG. 12 is a flow chart showing a processing procedure of display control according to a fourth embodiment of the invention.

FIG. 12 is a flow chart showing a processing procedure in a brightness display control method according to a fourth embodiment of the invention. In a single lens reflex digital camera, an optical image of a subject via an imaging lens is displayed in a finder. An EVF image can be displayed in the finder in the same manner as in the aforementioned embodiments.

The finder device 15 is equipped with an eye sensor which detects the photographer's viewing the finder to perform the following display control.

First, the camera waits for the eye sensor's detecting the photographer's eye (step S21). When the photographer's eye is detected, the flow of processing goes to next step S22. In the step S22, determination is made as to whether ambient illuminance is at least required brightness such as 1000 Lx or not. When determination is made that the camera is under a dark environment lower than 1000 Lx (determination results in No), the flow of processing goes to next step S23.

In the step S23, the camera waits for a given time T while the display brightness of the EVF image is set to be given low brightness such as 500 Lx. Then, in next step S24, the display brightness of the EVF image is stepped up to an upper limit value (2000 Lx in this example) at intervals of 500 Lx. In step S25, the brightness of the EVF image is set to be 2000 Lx. Then, this processing is terminated.

When the determination in the step S22 results in that the ambient illuminance is brightness not lower than 1000 Lx, the flow of processing skips to step S25 in which the display brightness of the EVF image is set to be 2000 Lx. Then, this processing is terminated.

Figure 13:
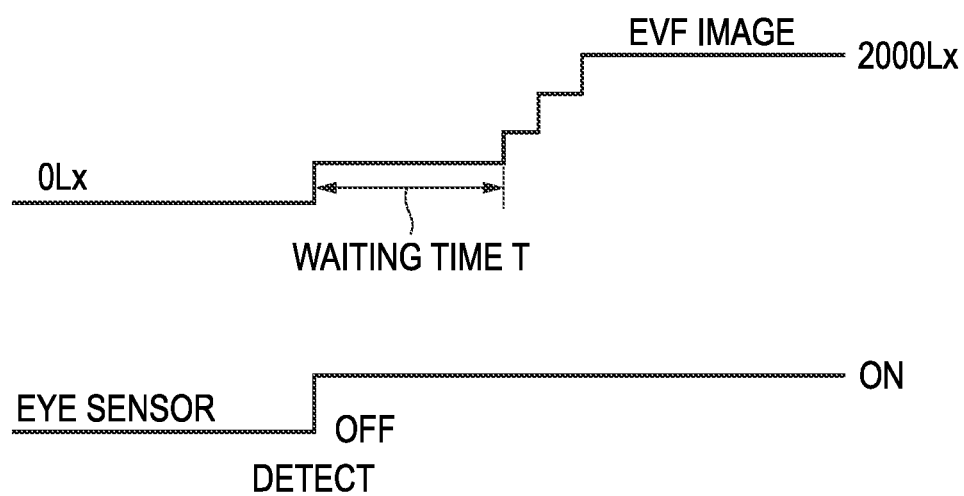
FIG. 13 is a view for explaining control of the brightness of the EVF image based on the processing procedure of FIG. 12.

FIG. 13 is a graph showing a state of brightness change of the EVF image based on the flow chart of FIG. 12. The display of the EVF image is switched on by the eye sensor's detection so that a dark image with 500 Lx is first displayed for a given time T. The waiting time T is determined in consideration of a stroke from the eye sensor's detecting the photographer's eye to the photographer's pupil's coming close to the photographer side finder observation window.

In this example, after passage of the waiting time T, the display brightness of the EVF image is stepped up at intervals of 500 Lx in the same manner as in each of the aforementioned embodiments. When the display brightness of the EVF image reaches given brightness (2000 Lx), the display brightness of the EVF image is fixed to the given brightness.

In this manner, the photographer viewing the EVF image is prevented from being dazzled because the photographer does not view a bright image with 2000 Lx suddenly.

Although each of the aforementioned embodiments shows the case where the brightness of the EVF image is increased stepwise, the brightness may be increased not stepwise but linearly or may be increased so that the angle of inclination of the straight line changes in the middle of a period between the control start to the control end.

When a user views a subject via an EVF image, for example, with 2000 Lx by using the finder device 15, the user may switch the finder device 15 to OVF. When the finder device 15 is switched to OVF, ambient light in the surroundings may be darker than the EVF image, inversely with the embodiment shown in FIG. 9. In this case, the finder device 15 may be switched to OVF suddenly because the eye is not dazzled even when the image is switched to an OVF image suddenly.

However, when the EVF image is switched to the OVF image while the brightness of the EVF image is decreased gradually, for example, at intervals of 500 Lx to approach the brightness of the OVF image so that the pupil of the eye is dilated gradually, the eye accustoms itself to the dark image rapidly. It can be said that this method is preferable.

FIGS. 14A and 14B are views showing brightness change of the EVF image in the case where the EVF image is switched to the OVF image while the brightness of the EVF image is decreased gradually. For the sake of comparison, this case is compared with the case where the EVF image is brightened gradually (e.g. the embodiment in FIG. 7).

FIG. 14A shows an example (B<A) in which the gradually darkening change speed B is set to be lower than the gradually brightening change speed A. With respect to the following speed of pupil dilation/contraction, the speed of change from a dilated state to a contracted state is higher than the speed of change from a contracted state to a dilated state. For this reason, it is preferable in consideration of this motion of the pupil that change in the case where the EVF image is darkened is made at a low speed, compared with the case where the EVF image is brightened.

In this manner, the photographer's eye viewing the finder can always catch the subject image. That is, even when the bright EVF image is darkened gradually or even when the EVF image is switched to the OVF image, the state where the eye accustoms itself to the brightness (darkness) can be always kept so that a picture can be taken without losing a shutter chance.

FIG. 14B shows an example (B>A) in which the gradually darkening change speed B is set to be higher than the gradually brightening change speed A. Because the change speed B is set to be higher than the change speed of the pupil, configuration is made so that the camera waits for the eye's accustoming itself in accordance with respective brightness steps shown stepwise in FIG. 14B but the time required for the eye's accustoming itself to the final darkness of the OVF image can be shortened.

When switching from EVF to OVF occurs under such ambient light in the surroundings that the OVF image is dark, whether switching based on FIG. 14A is selected, whether switching based on FIG. 14B is selected or whether the image is switched to the OVF image suddenly may be determined in accordance with the user's individual preference. Accordingly, configuration may be made so that they are selected on a menu screen by the user. Or FIG. 14A may be set as a default so that it can be changed in accordance with the user's instruction. Control in FIG. 14A or 14B can be used in combination with each of the embodiments shown in FIGS. 6 to 13.

In a display control method and a display control device for finder device discussed in the embodiments, the finder comprises: a half mirror which is provided in a finder device and which transmits an incident light image from a subject side and projects the incident light image onto a photographer side finder view window side; a display panel which is provided in a position facing the half mirror in the finder device and which displays a taken image of the subject taken by an imaging device with given brightness so that the displayed taken image is reflected by the half mirror so as to be projected onto the photographer side finder view window side; in which it is characterized in that brightness of the display image displayed on the display panel is changed so that the brightness of the display image increases gradually to given brightness or the brightness of the display image further increases gradually from the given brightness.

And, a display control method and a display control device for finder device are characterized in that: the brightness of the display image is controlled while interlocked with the opening/closing operation of a shutter which is provided in the finder device and which is opened/closed to control incidence of the incident light image on the half mirror.

And, the display control method and the display control device for finder device in the embodiments are characterized in that: the display brightness of an image is gradually increased to the given brightness when the image is displayed on the display panel in a state where the incident light image is darker than a given threshold.

And, the display control method and the display control device for finder device in the embodiments are characterized in that: the gradually brightening time and slope are changed in accordance with the type of the subject.

And, the display control method and the display control device for finder device in the embodiments are characterized in that: the display brightness is increased in a short time and steep slope when the brightness of the subject is not lower than a threshold in comparison with the time and slope in the case where the brightness of the subject is lower than the threshold.

And, the display control method and the display control device for finder device in the embodiments are characterized in that: the display brightness of a taken subject image is gradually increased to the given brightness when the subject image is displayed on the display panel in a state where the shutter is closed.

And, the display control method and the display control device for finder device in the embodiments are characterized in that: the display brightness of an image is gradually increased to the given brightness after the presence of a photographer's eye is detected by a sensor when the image is displayed on the display panel in a state where the shutter is closed.

And, the display control method and the display control device for finder device in the embodiments are characterized in that: a given waiting time is provided between the sensor's detection of the presence of the eye and the start of control for gradually increasing the display brightness.

And, the display control method and the display control device for finder device in the embodiments are characterized in that: the display brightness of the image in the waiting time is kept as given low brightness.

And, the display control method and the display control device for finder device in the embodiments are characterized in that: when the shutter is changed to be opened after the shutter is closed and the image with the given brightness is displayed on the display panel, the brightness of the incident light image is detected before opening of the shutter, and the brightness of the display image is gradually increased from the given brightness to be within a given value with respect to the brightness of the incident light image when the brightness of the incident light image is higher by at least a given threshold than the given brightness.

And, the display control method and the display control device for finder device in the embodiments are characterized in that: when the image projected onto the photographer side finder view window of the finder device is switched from the bright display image of the display panel to the dark incident light image, control is performed so that the projected image is switched to the incident light image after the display image of the display panel is darkened gradually, and that the gradually darkening display change speed and the gradually brightening display change speed are different from each other.

And, the display control method and the display control device for finder device in the embodiments are characterized in that: the gradually darkening display change speed is set to be lower than the gradually brightening display change speed.

And, the display control method and the display control device for finder device in the embodiments are characterized in that: the gradually darkening display change speed is set to be higher than the gradually brightening display change speed.

According to the aforementioned embodiments, because the display brightness of the EVF image displayed on the display panel changes gradually, the eye is prevented from being dazzled when a bright image is viewed suddenly so that it is easy to visually recognize the image.

INDUSTRIAL APPLICABILITY

According to the display control method for finder device according to the invention, because the EVF image is controlled to be gradually brightened in consideration of the change speed of the pupil of the photographer's eye when the EVF image is displayed, the photographer can visually recognize the EVF image while the photographer can be prevented from being dazzled. Accordingly, it is useful when it is applied to a digital camera equipped with a finder device for carrying out this display control method.

Although the invention has been described in detail or with reference to specific embodiments, it is obvious to those skilled in the art that various changes or modifications can be made without departing from the spirit and scope of the invention.

This application is based on Japanese Patent Application (Patent Application 2010-210226) filed on Sep. 17, 2010, and the contents thereof are incorporated here as reference.

REFERENCE SIGNS LIST 10 digital camera
11 housing
13 imaging lens
15 hybrid finder device
16 subject side finder window
17 photographer side view window
21 solid-state imaging device
32 CPU
33 image signal processing circuit
61 EVF display device
62 OVF shutter
63 half mirror

The invention claimed is:

1. A display control device for finder device, comprising:
a half mirror which is provided in a finder device and which transmits an incident light image from a subject side and projects the incident light image onto a photographer side finder view window side;
a display panel which is provided in a position facing the half mirror in the finder device and which displays a taken image of the subject taken by an imaging device with given brightness so that the displayed taken image is reflected by the half mirror so as to be projected onto the photographer side finder view window side;
a display control portion which changes brightness of the display image displayed on the display panel so that the brightness of the display image increases gradually to the given brightness or the brightness of the display image further increases gradually from the given brightness; and
a shutter which is provided in the finder device and which is opened/closed to control incidence of the incident light image on the half mirror,
wherein the display control portion controls the brightness of the display image while interlocking with the opening/closing operation of a shutter.

2. The display control device for finder device according to claim 1, wherein:
the display control portion increases the display brightness of the image gradually to the given brightness when the image is displayed on the display panel in a state where the incident light image is darker than a given threshold.

3. The display control device for finder device according to claim 2, wherein:
the display control portion changes the time and slope of the gradual brightness increase in accordance with the type of the subject.

4. The display control device for finder device according to claim 3, wherein:
the display brightness is increased in a short time and steep slope when the brightness of the subject is not smaller than a threshold, in comparison with the time and slope in the case where the brightness of the subject is smaller than the threshold.

5. The display control device for finder device according to claim 1, wherein:
the display control portion increases the display brightness of the subject image gradually to the predetermined given brightness when the taken subject image is displayed on the display panel in a state where the shutter is closed.

6. The display control device for finder device according to claim 1, further comprising:
a sensor which detects the presence of a photographer's eye;
wherein: the display control portion increases the display brightness of the image gradually to the given brightness when the sensor detects the presence of the eye in the case where the image is displayed on the display panel in a state where the shutter is closed.

7. The display control device for finder device according to claim 6, wherein:
the display control portion provides a given waiting time till the start of control to increase the display brightness gradually after the sensor's detecting the presence of the eye.

8. The display control device for finder device according to claim 7, wherein:
the display brightness of the image in the waiting time is kept as given low brightness.

9. The display control device for finder device according to claim 1, wherein:
when the shutter is changed to be opened after the shutter is closed and the image with the given brightness is displayed on the display panel, the display control portion detects the brightness of the incident light image before opening of the shutter, and gradually increases the brightness of the display image from the given brightness to be within a given value with respect to the brightness of the incident light image when the brightness of the incident light image is higher by at least a given threshold than the predetermined brightness.

10. The display control device for finder device according to claim 1, wherein:

when the image projected onto the photographer side finder view window of the finder device is switched from the bright display image of the display panel to the dark incident light image, the display control portion performs control so that the projected image is switched to the incident light image after the display image of the display panel is darkened gradually, and that the gradually darkening display change speed and the gradually brightening display change speed are different from each other.

11. The display control device for finder device according to claim 10, wherein:
the gradually darkening display change speed is set to be lower than the gradually brightening display change speed.

12. The display control device for finder device according to claim 10, wherein:
the gradually darkening display change speed is set to be higher than the gradually brightening display change speed.

13. A display control method for a finder device, including a half mirror which is provided in a finder device and which transmits an incident light image from a subject side and projects the incident light image onto a photographer side finder view window side, and a display panel which is provided in a position facing the half mirror in the finder device and which displays a taken image of the subject taken by an imaging device with given brightness so that the displayed taken image is reflected by the half mirror so as to be projected onto the photographer side finder view window side; wherein:
brightness of the display image displayed on the display panel is changed so that the brightness of the display image increases gradually to the given brightness or the brightness of the display image further increases gradually from the given brightness.

14. The display control method for finder device according to claim 13, wherein:
the brightness of the display image is controlled while interlocked with the opening/closing operation of a shutter which is provided in the finder device and which is opened/closed to control incidence of the incident light image on the half mirror.

15. The display control method for finder device according to claim 14, wherein:
the display brightness of a taken subject image is gradually increased to the given brightness when the subject image is displayed on the display panel in a state where the shutter is closed.

16. The display control method for finder device according to claim 14, wherein:
the display brightness of an image is gradually increased to the given brightness after the presence of a photographer's eye is detected by a sensor when the image is displayed on the display panel in a state where the shutter is closed.

17. The display control method for finder device according to claim 16, wherein:
a given waiting time is provided between the sensor's detection of the presence of the eye and the start of control for gradually increasing the display brightness.

18. The display control method for finder device according to claim 17, wherein:
the display brightness of the image in the waiting time is kept as given low brightness.

19. The display control method for finder device according to claim 14, wherein:
when the shutter is changed to be opened after the shutter is closed and the image with the given brightness is displayed on the display panel, the brightness of the incident light image is detected before opening of the shutter, and the brightness of the display image is gradually increased from the given brightness to be within a given value with respect to the brightness of the incident light image when the brightness of the incident light image is higher by at least a given threshold than the given brightness.

20. The display control method for finder device according to claim 13, wherein:
the display brightness of an image is gradually increased to the given brightness when the image is displayed on the display panel in a state where the incident light image is darker than a given threshold.

21. The display control method for finder device according to claim 20, wherein:
the gradually brightening time and slope are changed in accordance with the type of the subject.

22. The display control method for finder device according to claim 20, wherein:
the display brightness is increased in a short time and steep slope when the brightness of the subject is not lower than a threshold in comparison with the time and slope in the case where the brightness of the subject is lower than the threshold.

23. The display control method for finder device according to claim 13, wherein:
when the image projected onto the photographer side finder view window of the finder device is switched from the bright display image of the display panel to the dark incident light image, control is performed so that the projected image is switched to the incident light image after the display image of the display panel is darkened gradually, and that the gradually darkening display change speed and the gradually brightening display change speed are different from each other.

24. The display control method for finder device according to claim 23, wherein:
the gradually darkening display change speed is set to be lower than the gradually brightening display change speed.

25. The display control method for finder device according to claim 23, wherein:
the gradually darkening display change speed is set to be higher than the gradually brightening display change speed.

* * * * *